UNITED STATES PATENT OFFICE.

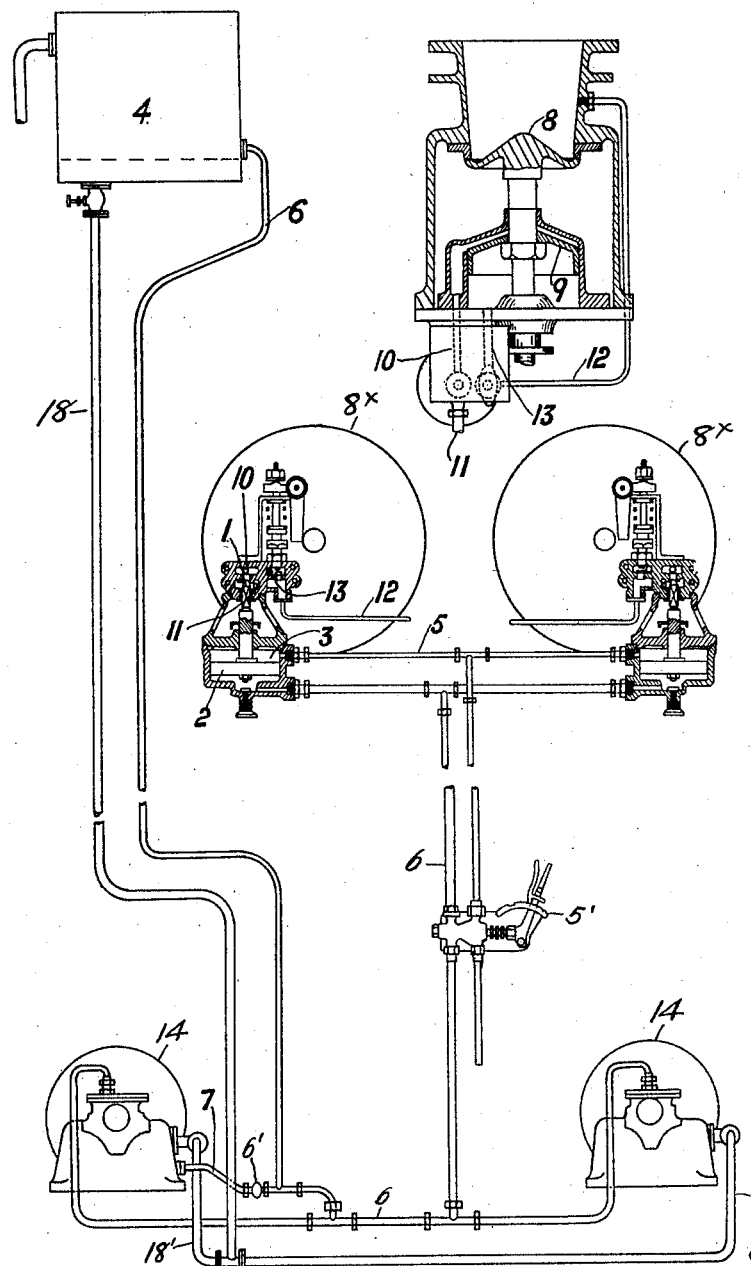

DAVID COCKBURN AND DONALD MacNICOLL, OF CARDONALD, NEAR GLASGOW, SCOTLAND.

ENGINE STOP-GEAR.

1,401,239.　　　　Specification of Letters Patent.　　Patented Dec. 27, 1921.

Application filed December 9, 1919. Serial No. 343,615.

*To all whom it may concern:*

Be it known that we, DAVID COCKBURN and DONALD MACNICOLL, subjects of the King of the United Kingdom of Great Britain and Ireland, and residing at Cardonald, near Glasgow, Scotland, have invented a certain new and useful Improvement in Engine Stop-Gears, of which the following is a specification.

This invention relates to engine stop gear in which a relay valve controls the flow of steam to a cylinder containing a piston operatively connected to an emergency valve which is closed on the opening of the relay valve, the relay valve being normally held closed by a piston movable in an oil-containing cylinder connected by piping to a supply tank of a forced lubrication system.

Characteristic of the invention is the feature that the tank has an overflow opening located above the level of the oil-containing cylinder and discharging into the piping connected to the said cylinder, from which piping there is a continuous escape into the return oil system, so that, as long as the overflow from the tank continues, the piston in the oil-containing cylinder is maintained in position to close the relay valve, but when the overflow ceases the oil-containing cylinder is emptied and the piston therein falls so as to permit the relay valve to open.

In the drawings Figure 1 is a diagram partly in elevation partly in section showing an installation of engine stop gear according to the invention. Fig. 2 is a horizontal section showing the emergency valve.

In the construction illustrated there are two emergency valves and two relay valves. As the operation of one relay valve and its emergency valve is the same as that of the other relay valve and its emergency valve it will be sufficient to describe only the operation of one relay valve and its emergency valve. It may be pointed out also that in the drawings, for the sake of clearness, the relay valves and emergency valves are shown to a much larger scale than the turbines the supply of steam to which is controlled by the emergency valves.

The relay valve 1 is vertically movable by a piston 2 which is vertically movable in an oil-containing cylinder 3. The lower side of the piston 2 is acted on by oil led to the cylinder 3 by way of an overflow pipe connection 6 from an oil storage tank 4 at a higher level than the cylinder 3. From a point near the upper end of the cylinder 3 is led a connection 5 for oil which may leak past the piston 2. The piston 2 is held in its highest position so long as the pipe connection 6 is full of oil. The pipe connection 6 has, however, a connection with a pipe 7 forming part of the return oil system of the turbine 14, so that oil is always flowing from the pipe connection 6. In order, therefore, to maintain the piston 2 in its highest position, it is necessary that there should always be oil flowing into the pipe connection 6 at a rate not less than the rate at which oil escapes from the pipe connection 6.

When the level in the tank 4 falls below the overflow opening into the pipe connection 6 no further oil will enter the pipe connection 6, and as oil continues to escape into the pipe 7 the difference in head between the tank 4 and the cylinder 3 becomes zero or a minus quantity. The piston 2 then falls under the action of gravity and the relay valve 1 also falls under the action of gravity. When the relay valve 1 is thus opening, steam is allowed to escape and the emergency valve 8 is automatically closed by the steam. The flange of the emergency valve is shown at $8^x$ in Fig. 1.

The operation of the emergency valve is known, *per se*. When the relay valve 1 is open, steam from the face of the piston 9 nearest the valve 8 escapes by the port 10 past the valve 1 and hence through the pipe 11. The pressure of steam which has access to the other face of the piston 9 by way of the pipe 12 and passage 13 now closes the valve 8.

The tank 4 supplies the turbines 14 with lubricant which flows continuously thereto by way of the pipe 18 and branches 18' to the turbines. So long as there is oil in the tank 4, the turbines are therefore supplied with lubricant.

A manually operable device 5' actuates valves in the pipe connections 5, 6 so as to permit the discharge of oil from these pipes, when desired.

It will be seen from the foregoing that the relay valve 1 depends for its operation simply on the existence or absence of an overflow from the tank 4.

We claim:—

1. In an engine stop gear, the combination with an emergency valve operable by fluid pressure, a relay valve serving to control the escape of fluid pressure medium to effect operation of said emergency valve, a liquid conduit system, a cylinder connected to said system, a storage tank at a higher level than said cylinder, said tank having an overflow discharging into said system, and a piston movable in said cylinder, said piston connected to said relay valve, one side of said piston exposed to the pressure due to the head of liquid between the point of overflow from said tank and said cylinder, said piston maintaining said relay valve closed during the continuance of the overflow but permitting said relay valve to open on cessation of the overflow.

2. In an engine stop gear, the combination of an emergency valve, a fluid operated relay valve controlling the operation of the emergency valve, a storage tank for the fluid which operates the relay valve having a fixed overflow level, the position of the storage tank relative to the relay valve being such that when the fluid in the tank drops below the overflow level the relay valve operates the emergency valve.

3. In an engine stop gear, the combination of an emergency valve, a relay valve controlling the operation of the emergency valve and operated by the engine lubrication system, a storage tank for the lubricant having a fixed overflow level, a connection between the storage tank and the relay valve, the position of the storage tank relative to the relay valve being such that when the lubricant in the tank drops below the overflow level the relay valve operates the emergency valve.

4. Engine stop gear in which a relay valve controls the flow of steam to a cylinder containing a piston operatively connected to an emergency valve which is closed on the opening of the relay valve, the relay valve being normally held closed by a piston movable in an oil-containing cylinder connected by piping to a supply tank of a forced lubrication system, characterized by this that the tank has an overflow opening located above the level of the oil-containing cylinder and discharging into the piping connected to the said cylinder, from which piping there is a continuous escape into the return oil system, so that, as long as the overflow from the tank continues, the piston in the oil-containing cylinder is maintained in position to close the relay valve, but when the overflow ceases the oil-containing cylinder is emptied and the piston therein falls so as to permit the relay valve to open.

In testimony whereof we have signed our names to this specification in the presence of two subscribing witnesses.

DAVID COCKBURN.
DONALD MacNICOLL.

Witnesses:
KATE YOTHERNGHAN,
ISABEL ROLLO.